Figure 1:
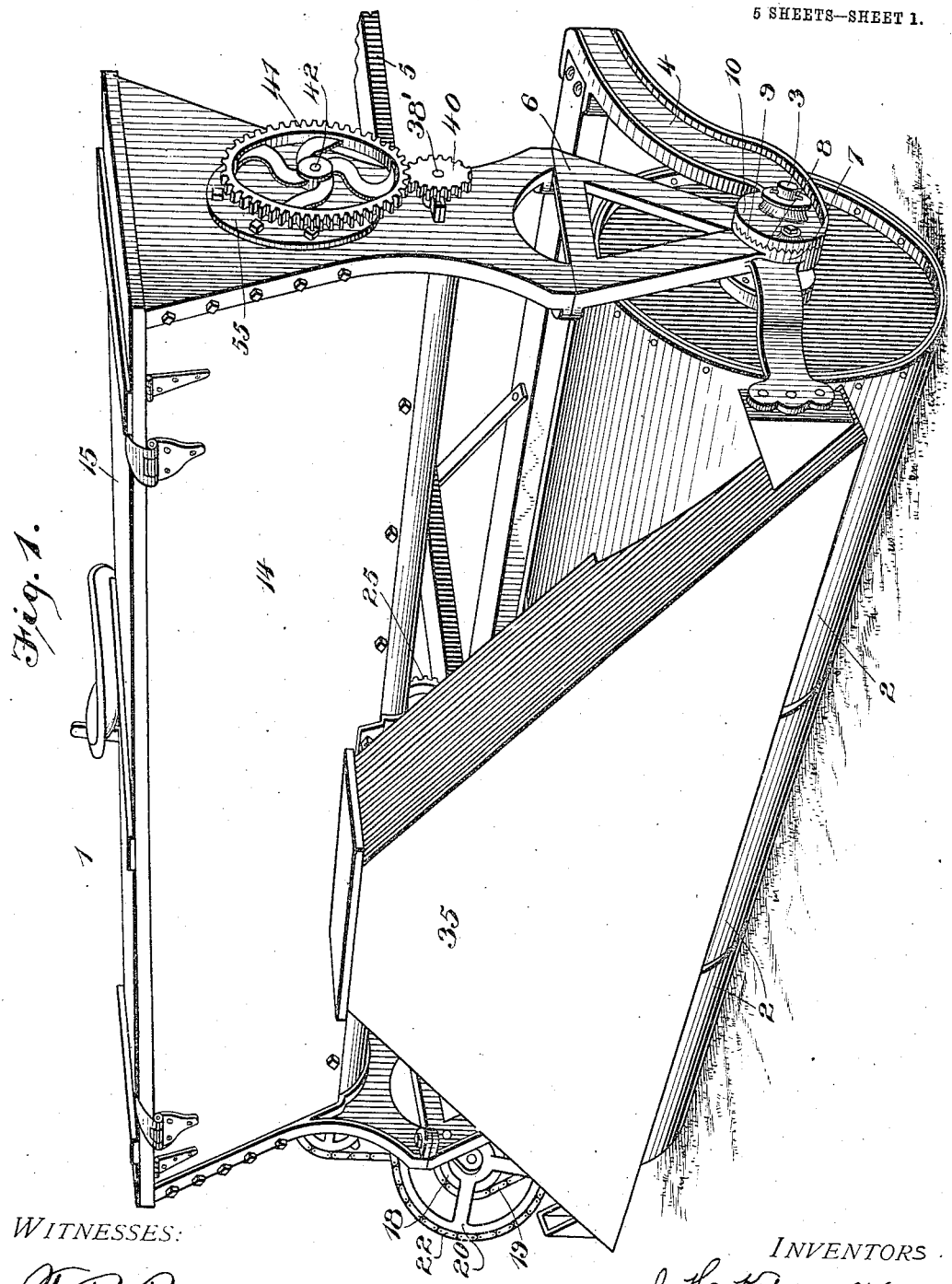

No. 843,680.

PATENTED FEB. 12, 1907.

J. H. & D. E. KEFAUVER.
LIME SPREADER.
APPLICATION FILED MAY 14, 1906.

5 SHEETS—SHEET 1.

WITNESSES:
T. P. Britt
E. C. Duffy

INVENTORS
J. H. Kefauver
D. E. Kefauver
BY
Attorneys

No. 843,680. PATENTED FEB. 12, 1907.
J. H. & D. E. KEFAUVER.
LIME SPREADER.
APPLICATION FILED MAY 14, 1906.
5 SHEETS—SHEET 2.
Fig. 2.
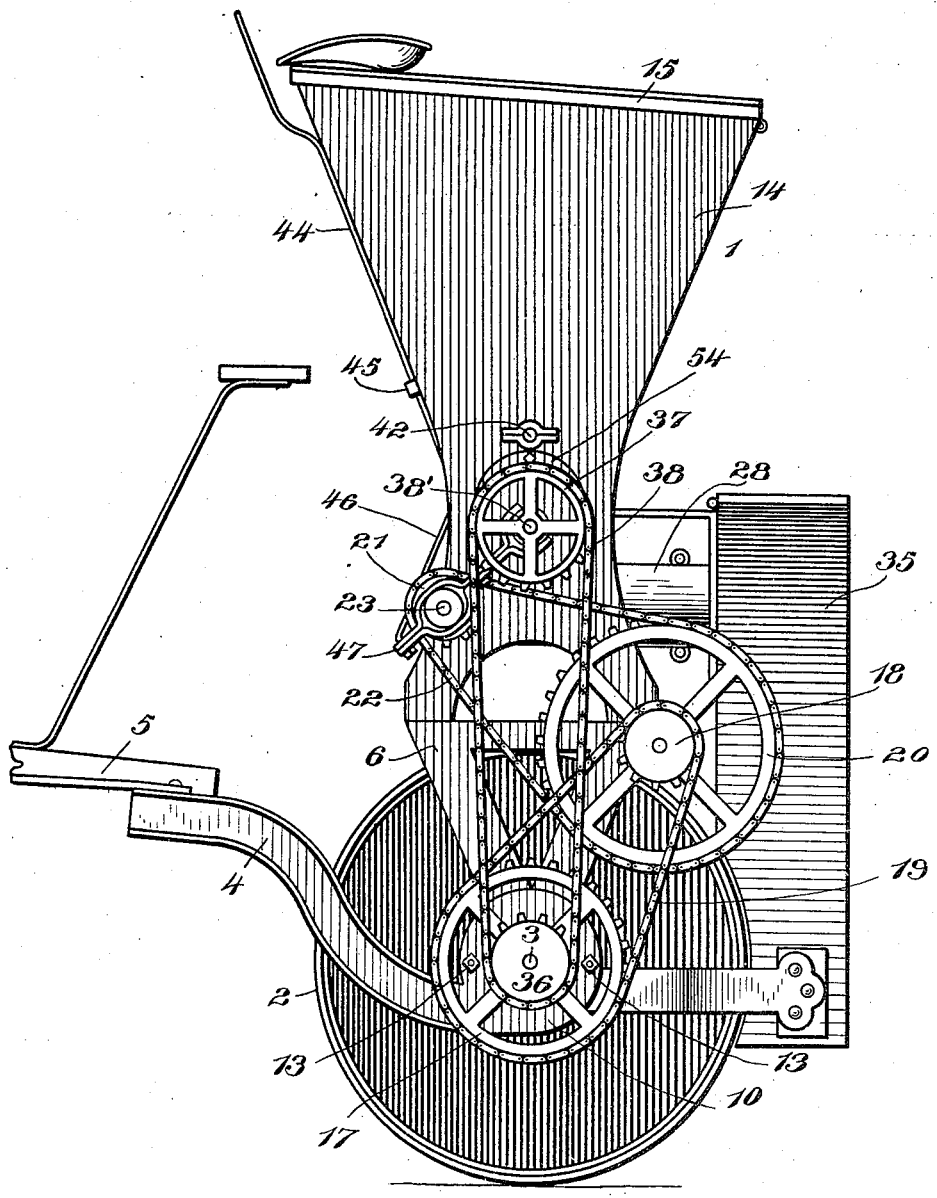
WITNESSES:
T. P. Britt
E. E. Duffy
INVENTORS
J. H. Kefauver
D. E. Kefauver
By 
Attorneys

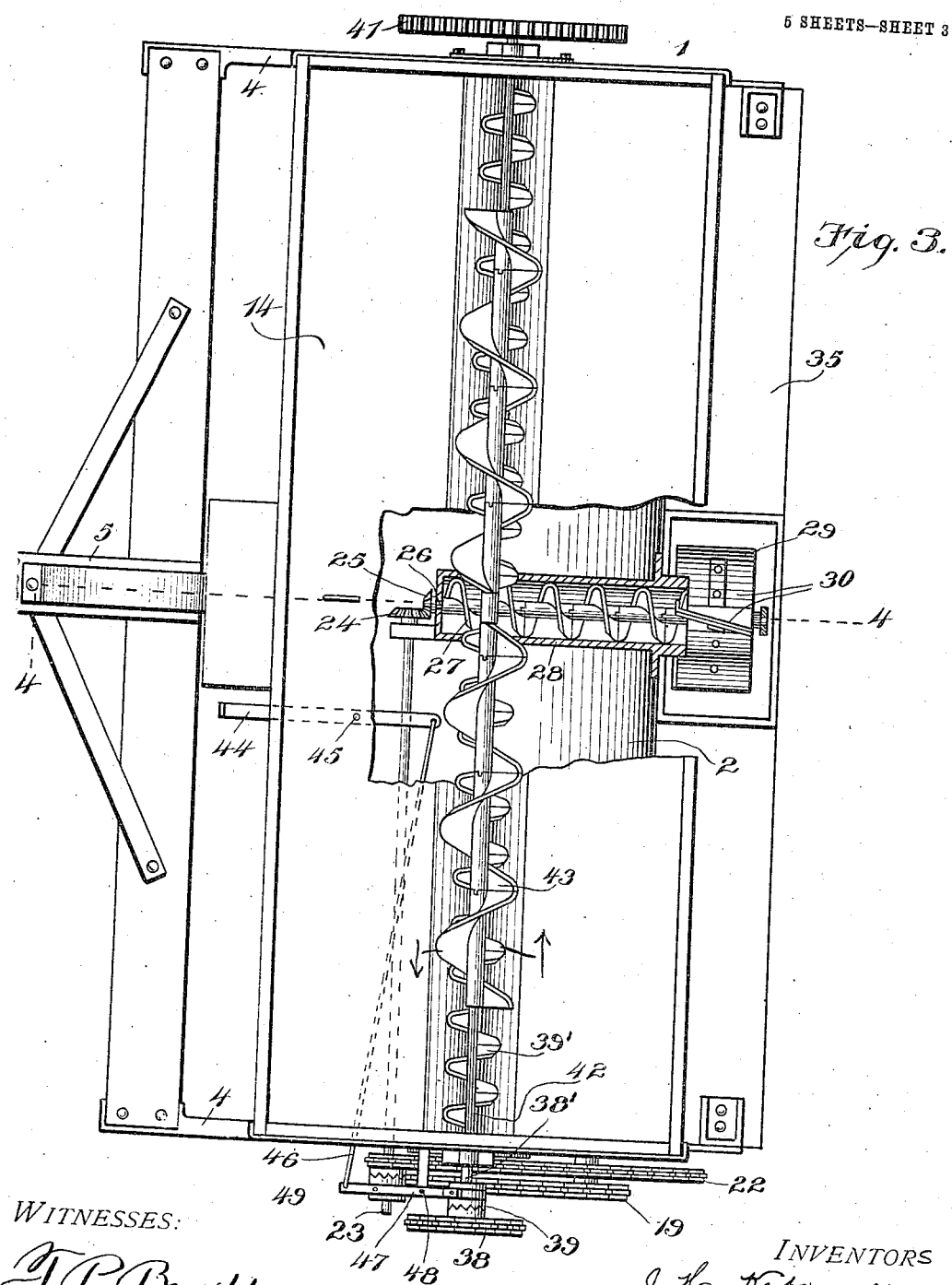

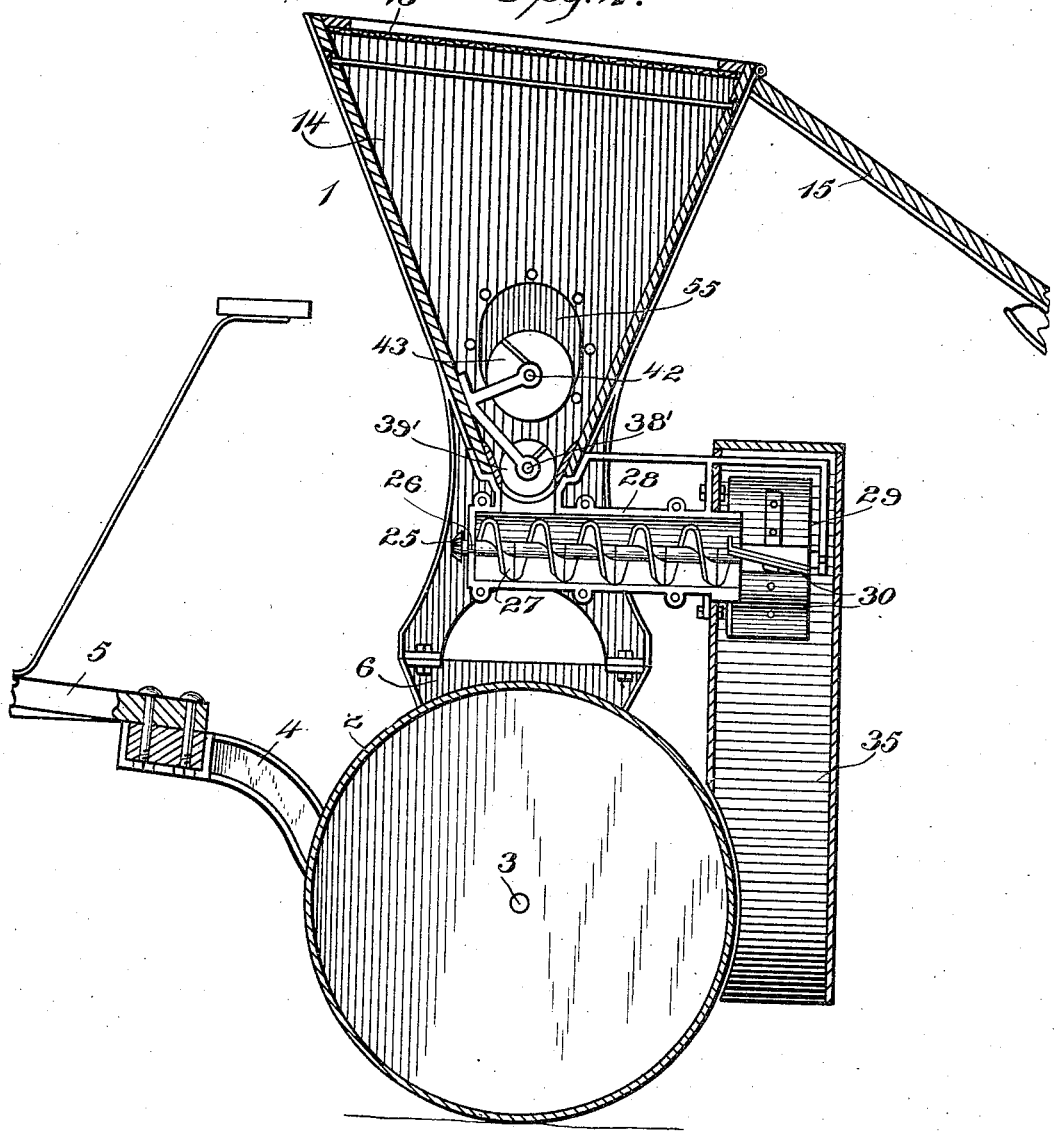

No. 843,680. PATENTED FEB. 12, 1907.
J. H. & D. E. KEFAUVER.
LIME SPREADER.
APPLICATION FILED MAY 14, 1906.
5 SHEETS—SHEET 5.
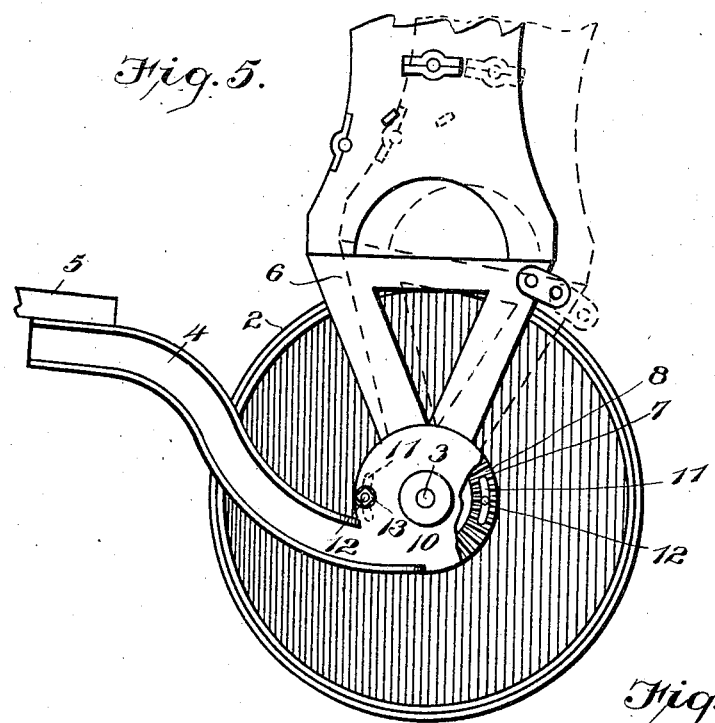
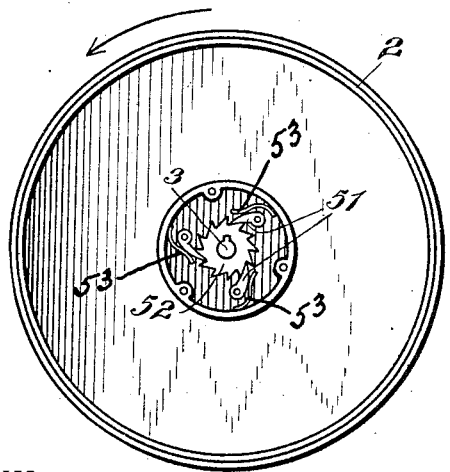
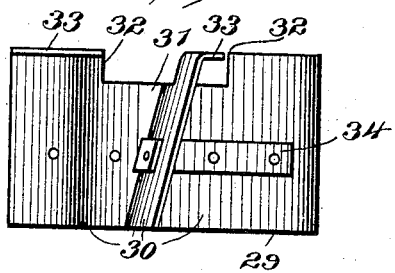
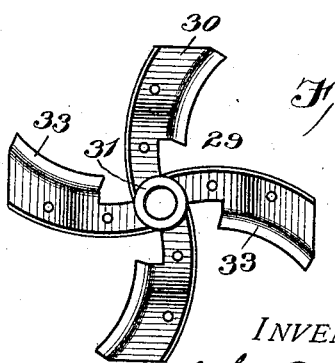
WITNESSES:
J. P. Britt
E. C. Duffy
INVENTORS
J. H. Kefauver
D. E. Kefauver
BY O. E. Duffy & Son
Attorneys

UNITED STATES PATENT OFFICE.

JOSEPH HOLLIN KEFAUVER AND DANIEL EDWARD KEFAUVER, OF MIDDLETOWN, MARYLAND.

LIME-SPREADER.

No. 843,680.   Specification of Letters Patent.   Patented Feb. 12, 1907.

Application filed May 14, 1906. Serial No. 316,714.

*To all whom it may concern:*

Be it known that we, JOSEPH HOLLIN KEFAUVER and DANIEL EDWARD KEFAUVER, citizens of the United States, residing at Middletown, in the county of Frederick and State of Maryland, have invented certain new and useful Improvements in Lime-Spreaders; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to lime-spreaders, and has for its object to provide a machine of this class which will quickly and effectually distribute lime from the hopper evenly and economically.

A further object of our invention is to provide a lime-spreader which is particularly simple in its construction, easy of operation, strong, durable, and efficient.

With these objects in view our invention consists in the construction for swinging the hopper of the machine relative to the draft-tongue for the horses.

Our invention also consists in the novel arrangement of the clutches for throwing the operating mechanism in and out of connection with the driving-rollers.

Our invention further consists in providing more than one worm-screw within the hopper for agitating and moving the lime, and our invention further consists in the novel construction of the lime-distributing wheel.

Our invention further consists in certain other novel features and in certain combinations of parts, all of which will be first fully described and afterward specifically pointed out in the appended claims.

Referring to the accompanying drawings, Figure 1 is a perspective view of the machine in an operative position. Fig. 2 is a side elevation thereof. Fig. 3 is a top plan view, the top of the hopper being removed and a portion of the hopper being cut away in order to show the operating mechanism. Fig. 4 is a vertical transverse sectional view taken through line 4 4 of Fig. 3. Fig. 5 is a side elevation showing the roller and illustrating the hopper-supporting frame in two different positions. Fig. 6 is an elevation of the roller, showing ratchet-and-pawl arrangement for allowing the rollers to rotate backwardly without driving the shaft. Fig. 7 is a plan view of the lime-distributing wheel, and Fig. 8 is a rear elevation thereof.

Like numerals of reference indicate the same parts throughout the several figures, in which—

1 indicates the machine, which comprises, preferably, three rollers 2, or a roller in three sections, said rollers being arranged on the shaft 3.

4 indicates the forward frame to which a draft-pole 5 is secured.

6 indicates the hopper-supporting frame, which, as shown in Fig. 1, is mounted on the roller-shaft 3, and the hub 7 of said frame is provided with a series of teeth or serrations 8, which mesh with a series of teeth or serrations 9 on the hub 10 of the forward frame 4. This construction is clearly shown in Fig. 5, from which figure it will be seen that the hub 7 of the hopper-supporting frame 6 is provided with two arc-slots 11, through which slots pins or bolts 12 pass, said pins or bolts being carried by the hub 10 of the forward frame 4, and said bolts are provided with ends 13 to receive nuts, so that the two hubs 7 and 10 can be held in rigid engagement with each other.

Referring again to Fig. 1, it will be seen that a hopper 14 is carried by the hopper-supporting frame 6, said hopper being provided with a top or cover 15 and a screen 16, Fig. 4, so as to sift the lime passing into the hopper and preventing all large lumps from entering same.

Referring to Fig. 2, it will be seen that a large sprocket-wheel 17 is carried on the roller-shaft 3, said sprocket-wheel 17 being connected to a smaller sprocket-wheel 18 by means of a sprocket-chain 19. Connected to said sprocket-wheel 18 is a larger sprocket-wheel 20, which sprocket-wheel 20 is geared to a smaller sprocket-wheel 21 by means of a sprocket-chain 22.

Referring now to Fig. 3, it will be seen that the sprocket-wheel 21 is carried on a shaft 23, which shaft extends transversely and carries a bevel-pinion 24 on the inner end thereof, and in mesh with said bevel-pinion 24 is a bevel-pinion 25, carried on a shaft 26, which shaft carries a worm screw 27, lying longitudinally and horizontally at the center of the machine and below the hopper-bottom 14. The said worm screw 27 is inclosed in a casing 28. Carried on the outer end of the shaft 26 is a fan or distributer 29, which, as shown in Figs. 7 and 8, is constructed of preferably four blades 30. Each of said blades, as shown in Fig. 7, is cut away around the hub 31, so that the inner edges 32 of the blades extend over the outer end of the worm-screw casing 28, and, as will be seen from Fig. 7, the extreme inner edges 33 of said blades 30 are bent substantially at right angles to the said blades. The said blades 30 are secured in position by means of spokes 34, which are connected to the hub 31 of the wheel, said spokes acting as a stiffening for the blades.

Referring now to Figs. 1 and 4, it will be seen that a hood 35 is provided in rear of the machine and completely covers the lime-distributing wheel 29, said hood flaring so that at the extreme bottom edge thereof it is practically as wide as the machine.

Referring again to Fig. 2, it will be seen that a small sprocket-wheel 36 is carried on the roller-shaft 3, said sprocket-wheel being geared to a sprocket-wheel 37 by means of a sprocket-chain 38.

Referring now to Fig. 3, it will be seen that the sprocket-wheel 37 is loosely carried on the shaft 38', a clutch 39 being employed to throw said sprocket-wheel 37 in and out of connection with the shaft 38'. Carried on the shaft 38, which shaft extends transversely through the hopper 14 at the bottom thereof, is a double worm-screw 39', said screw 39' being constructed so that when revolving it leads lime toward the center of the hopper from both ends thereof.

Referring to Fig. 1 in connection with Fig. 3, it will be seen that a small pinion-wheel 40 is carried on the end of the shaft 38', which pinion-wheel is in mesh with a large gear-wheel 41, carried on the shaft 42. Referring now to Fig. 3, it will be seen that the shaft 42 carries a large worm-screw 43, said shaft 42 and worm-screw being directly above the shaft 38' and small worm-screw 39', as shown in Fig. 4, the direction of rotation of the large worm-screw 43 being the opposite to the direction of rotation of the small worm-screw 39' and said worm-screw being so pitched as to lead the lime away from the center of the hopper when rotating. Thus we have in this construction an upper worm screw, acting as an agitator and leading the lime away from the center of the hopper, and a lower worm screw under said first-mentioned worm-screw, which leads the lime toward the center of the hopper from both ends thereof.

Referring to Figs. 2 and 3, it will be seen that an operating-lever 44 is fulcrumed at 45, a reach-rod 46 connecting the end of said lever with a lever 47, which is pivoted at 48, said lever 47 carrying two clutch members 49 and 39. The clutch member 49 being carried on the shaft 23 throws said shaft into and out of engagement with the sprocket-wheel 21, while the clutch member 39 throws the worm-shaft 38 into and out of engagement with the sprocket-wheel 37. Thus it will be seen that by one movement of the lever 44 both the clutch members 49 and 39 are thrown simultaneously into or out of engagement with the sprocket-wheels 21 and 37. By this arrangement of parts the entire operating mechanism of the machine can be instantly thrown into or out of operation.

Referring now to Fig. 6, it will be seen that the roller 2 carries a series of pawls 51 and that the ratchet-wheel 52 is carried on the shaft 3. A series of leaf-springs 53 normally tend to hold the pawls 51 in engagement with the ratchet-wheel 52, so that when the roller 2 is moving in the direction of an arrow the shaft 3 is revolved with the roller. When the roller 2, however, is moved in the reverse direction—as, for instance, when the machine is making a short turn—the shaft 3 is not rotated by the roller 2.

As shown in Figs. 2 and 4, two removable plates 54 and 55 are arranged in each end of the hopper 14, so as to admit free access to the worm-screws 39' and 43.

Having thus described the several parts of our invention, its operation is as follows: Lime is thrown upon the top of the hopper and, as shown in Fig. 4, the screen 16 prevents the large lumps from entering. When sufficient quantity of lime has been introduced into the hopper, the machine is put in operation. The rotation of the rollers 2 by means of the intermediate gearing rotate the two worm-screws 39' and 43 within the hopper and the longitudinal worm-screw 27 and distributing fan or wheel 29. As before described, the upper worm-screw 43 is so constructed as to agitate the lime and lead the same from the center of the hopper, while the lower worm 39' is arranged to lead the lime from the ends of the hopper toward the center thereof, as indicated by arrows in Fig. 3, as we have found that there is a tendency of the lime congesting in the center of the hopper unless some construction is employed for leading the lime away from the center of the hopper. As shown in Fig. 4, the hopper empties into the worm-screw casing 28, where it is engaged by the worm-screw 27 and forces rearwardly, emptying out of the rear end of the worm-screw casing and onto the blades 30 of the distributing wheel or fan 29, the bent edges 33 of said wheel preventing the lime from falling in front of the wheel, and the construction of the blades of the wheel, which allow a portion of the blades to extend over the worm-screw casing 28, makes it absolutely certain that all of the lime which passes from the worm-screw will fall upon and be caught up by the blades of the lime-distributing fan or wheel 29, and, as shown in Figs. 3, 7, and 8, the blades 30 of the fan or distributing-wheel 29 are so curved that the lime falling thereon is thrown or distributed equally on both sides thereof, and as the blades of the fan or wheel 29 are constructed, preferably, of thin sheet metal the pitch or curve of the said blades can be changed or altered in order to regulate the throw of the lime therefrom.

As shown in Fig. 5, the hopper and mechanism can be pitched either forward or aft, as indicated in dotted lines, in order to perfectly balance the machine, so that the team may be relieved from the weight of the hopper.

Having thus fully described our invention, what we claim as new, and desire to secure by Letters Patent of the United States, is—

1. In a distributing device of the character described, the combination of a suitable roller, a hopper for carrying material to be distributed, means for distributing the material from said hopper, and means for swinging the said hopper forwardly or backwardly over said roller on the axle of said roller, substantially as described.

2. In a distributing device of the character described, the combination of a suitable roller, a frame associated therewith, a hopper means for distributing the material from said hopper, a frame supporting said hopper, means for connecting said hopper-supporting frame with said first-mentioned frame, and means for moving said hopper-supporting frame relatively to said first-mentioned frame, said hopper-supporting frame being pivoted on the axle of said roller, substantially as described.

3. In a distributing device of the character described, the combination of a suitable roller, a shaft therefor, a frame carried on said shaft, a hopper, means for distributing the material from said hopper, a frame supporting said hopper, said frame being carried on said shaft, means for locking said hopper-supporting frame to said first-mentioned frame, and means for adjusting position of said hopper-supporting frame relatively to said first-mentioned frame said hopper-supporting frame being pivoted on the axle of said roller, substantially as described.

4. In a distributing device of the character described, the combination of a roller, a hopper associated with said roller and provided with an opening therein, a worm-screw secured in said hopper for forcing the lime toward said opening, and a similar worm-screw in said hopper for forcing the lime away from said opening, substantially as described.

5. In a distributing device of the character described, the combination of a hopper and two independent worm-screws in said hopper one of said worm-screws being arranged above the other, substantially as described.

6. In a distributing device of the character described, the combination of a hopper, a worm-screw in said hopper and a similar worm-screw arranged above said first-mentioned worm-screw, both of said worm-screws being located with the hopper, substantially as described.

7. In a distributing device of the character described, the combination of a hopper provided with an opening therein, a worm-screw in said hopper arranged to force the lime toward said opening, and a similar worm-screw in said hopper arranged to force the lime away from said opening, substantially as described.

8. In a distributing device of the character described, the combination of a hopper provided with an opening in the center thereof, a worm-screw in said hopper arranged to lead the lime from the ends of the hopper toward the opening in the center thereof, and a similar worm-screw in said hopper above first-mentioned worm-screw for agitating the lime, substantially as described.

9. In a distributing device of the character described, the combination of a roller, a shaft and hopper associated therewith, a worm-screw in said hopper, a worm-screw below said hopper arranged to receive the lime from said hopper, means for rotating said two worm-screws, a clutch associated with said worm-screw in said hopper and a clutch associated with the driving mechanism of said worm-screw below said hopper, a lever pivoted between said two clutches, means for operating said lever for throwing said clutches in and out of engagement, substantially as described.

10. In a distributing device of the character described, the combination of a hopper, screws located in said hopper, a worm-screw under said hopper arranged to receive the material passing from said hopper, and means for distributing the material passing from said last-mentioned worm-screw, substantially as described.

11. In a distributing device of the character described, the combination of a hopper provided with an opening therein, a worm-screw below said hopper and arranged to receive the material passing from said hopper, a distributing-wheel connected to said worm-screw, a casing for said worm-screw, the blades of said wheel extending over the end of said casing, substantially as described.

12. In a distributing device of the character described, the combination of a hopper provided with an opening therein, a worm-screw under said hopper and arranged to receive the lime passing from said hopper, a casing for said worm-screw, a distributing-wheel rotated with said worm-screw, the blades of said wheel extending over the end of said casing, said blades having their inner edges turned at substantially right angles to the blades, substantially as described.

13. In a distributing device of the character described, the combination of a hopper provided with an opening therein, means arranged below said hopper for receiving the lime passing therefrom, a distributing-wheel provided with blades, the inner edges of said blades being turned at substantially right angles to the blades, substantially as described.

In testimony whereof we affix our signatures in presence of two witnesses.

JOSEPH HOLLIN KEFAUVER.
DANIEL EDWARD KEFAUVER.

Witnesses:
HERMAN L. ROUTZAHN,
JOHN L. ROUTZAHN.